(12) United States Patent
Maurer et al.

(10) Patent No.: US 8,661,461 B1
(45) Date of Patent: Feb. 25, 2014

(54) IN-HOME ENTERTAINMENT MEDIA STREAMING VIEWERS HEADCOUNT-BASED PRICING MODEL

(76) Inventors: Michael Glenn Maurer, Woolwich Township, NJ (US); Olajide Jaji, Pittsburgh, PA (US); Ragini Bhoopathy, Audobon, PA (US); Raghava Cittineni, West Deptford, NJ (US)

( * ) Notice: Subject to any disclaimer, the term of this patent is extended or adjusted under 35 U.S.C. 154(b) by 0 days.

(21) Appl. No.: 13/565,274

(22) Filed: Aug. 2, 2012

(51) Int. Cl.
*H04N 7/16* (2011.01)
(52) U.S. Cl.
USPC .................................................. 725/8; 725/1
(58) Field of Classification Search
USPC ......................................................... 725/1, 8
See application file for complete search history.

(56) References Cited

U.S. PATENT DOCUMENTS

| | | | |
|---|---|---|---|
| 2009/0144765 A1* | 6/2009 | Branam | 725/1 |
| 2010/0131558 A1* | 5/2010 | Logan et al. | 707/783 |
| 2010/0158101 A1* | 6/2010 | Wu et al. | 375/240.01 |
| 2010/0318419 A1* | 12/2010 | Vieri | 705/14.45 |

* cited by examiner

*Primary Examiner* — Mulugeta Mengesha
(74) *Attorney, Agent, or Firm* — Oakwood Law Group, LLP; Stephen Liu

(57) ABSTRACT

The method and system of the present invention allows the media content providers to count the number of people watching the media content being streamed and apply the viewer headcount pricing model like how it is done in the movie theaters to capture revenues lost at the movie theaters from streaming video content directly to the home. The central component of the viewer headcount pricing model is the utilization of the facial recognition range camera and/or motion sensor to determine the number of viewers and charge the customers by the headcount.

2 Claims, 3 Drawing Sheets

IN-HOME ENTERTAINMENT MEDIA STREAMING VIEWERS HEADCOUNT-BASED PRICING MODEL

BACKGROUND OF THE INVENTION

1. Field of the Invention

The present invention relates to systems and methods for streaming video service pricing models, and more particularly to systems and methods which ensures content providers that the correct number of viewers pay for their streaming service based on a viewer headcount pricing model.

2. Description of Related Art

New developments in digital technology make server-based file sharing on the Internet convenient and fast. Movie studios and associated distributors are losing significant revenues due to many people staying at home and using streaming video services into their home such as Netflix, Blockbuster, Hulu, etc. Although these streaming video services may have business contracts to share revenues with the movie studios and associated distributors, the revenues lost due to streaming services may not be compensated due to current pricing model of the media streaming service providers.

Currently, most of the streaming video services gain revenues on the basis of monthly membership or pay by view. That means, once a person registers as a member, most of contracts allow them to watch unlimited streaming video per month. Most streaming video service providers do not charge based on how many viewers are watching the streaming video. Using Netflix as an example, anyone can sign into a Netflix account with a valid account name and password. Not only that, multiple people can sign into the same Netflix account at the same time and watch different contents so often times one account name is shared among multiple people or multiple viewers can watch the same streaming video together. If the streaming service is based on pay by view, it does not control how many viewers watch the same streaming video either. Often times, multiple people are watching the same streaming video at the same time. That means multiple viewers can watch a movie online with only one payment. This pricing model of streaming video services indirectly negatively affects the revenues of movie studios and associated distributors.

Therefore, it is desirable to have a system and method for the movie studios, online gaming and educational providers, distributors, and any other online venue to capture revenues from streaming video content directly to the home or any computing device by charging on viewer headcount basis. Using a system wherein the viewer is counted no matter how many are watching the program at the same time or for that matter no matter from how many different locations using the same login and password. This will prevent overusage of an account and underpayment for the service.

SUMMARY OF THE INVENTION

The present invention relates to systems and methods for a streaming video service pricing model, and more particularly to systems and methods ensuring content providers that all viewers pay for their streaming service on a basis of viewer headcount pricing model.

Currently, media content streaming service providers do not limit multiple viewers to watch a movie being streamed. The current model for the media content streaming service is a flat rate that is a monthly membership fee or pay per view. While at the movie theaters, the viewer pricing model is a viewing ticket per person. Therefore, in order to regain the revenue lost by the current business model, the media content providers need to simulate the movie theater pricing model and charge streaming service based on the headcount of the viewers.

The challenge to the viewer headcount pricing model is how to accurately monitor and track the correct number of viewers in order to accurately bill the viewers.

With the development of camera devices that have internet connections combined with facial recognition software and/or motion sensors and the increasing availability of these affordable technologies, it is now possible for content providers to verify the number of viewers in the audience/room for billing. Additionally, television manufacturers are building cameras with this functionality into their products.

The present invention will allow content providers to count the number of people watching the content being streamed and apply the viewer pricing model like how it is done in the movie theaters to capture revenues lost at the movie theaters from streaming video content directly to the home.

The present invention will provide systems and methods that utilize any technologies available currently and in the future that can verify the number of viewers in the audience/room to ensure the viewers pay for watching the streaming content.

The systems and methods of the present invention further provide streaming service which has copyright protection to avoid media theft.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following

FIG. 3 illustrates a process which provides viewer headcount pricing model including equipment/software/service to any third party media content providers that they are in partnership with.

DESCRIPTION OF THE PREFERRED EMBODIMENT

Figure 1:
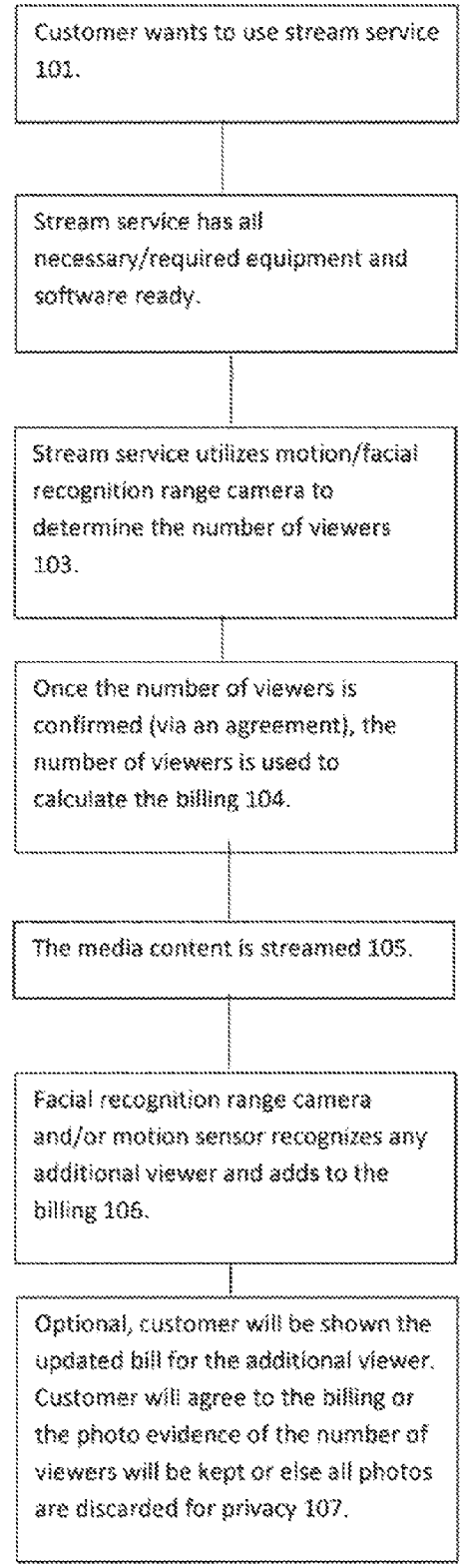
FIG. 1 is a flowchart 100 illustrating the process for charging streaming video viewer(s) by headcount.

The method and system of the present invention is able to allow the content provider to count the number of people watching the content being streamed and apply the viewer headcount pricing model like how it is done in the movie theaters to capture revenues lost at the movie theaters from streaming video content directly to the home. A flowchart 100 illustrating the process for charging streaming video viewer(s) by headcount is shown in FIG. 1. The central component of the viewer headcount pricing model is the utilization of the facial recognition range camera and/or motion sensor to determine the number of viewers.

In one embodiment, customers agree with an agreement to use media streaming service at block 101. Stream service will have all necessary/required equipment ready. The equipment may be purchased or provided by the media content provider or the service may utilize equipments with similar technology that is supported by the service at block 102. Television manufacturers are starting to make TVs with built in cameras. There are currently numerous facial recognition cameras in the market (for ex. the Microsoft Kinect) and due to its popularity, more cameras with innovative technology will be rolling out in the future. Stream service utilizing a facial recognition range camera and/or motion sensor to determine the number of viewers (the camera uses facial recognition to recognize human viewers and to distinguish between different viewers at block 103. Once the number of viewers is confirmed (via an online agreement), the number of viewers is used to calculate the billing at block 104. The media content provider starts to provide media content streaming at block 105. If the facial recognition range camera and/or motion sensor recognizes any additional viewer it adds the additional viewer to the billing at block 106. Optionally, customers will be presented the updated bill for the additional viewer(s) at the end. If the customers agree to the billing the photos of the viewers may be discarded for privacy, otherwise, the photo evidence of the number of viewers will be kept at block 107.

In one embodiment the range camera and/or motion sensor device with facial recognition software may use a variety of technology known in the art such as two-dimensional face recognition (2D face recognition) and/or three-dimensional face recognition (3D face recognition).

A range camera is used to acquire 3D images and by using the three-dimensional geometry of the human face, 3D face recognition can be achieved. The range image produced by some type of sensor device where it is a 2D image with pixel values at each point in a scene which correspond to the distance from a reference point, brighter values mean shorter distance, or vice versa. Range cameras can operate according to a number of different techniques, such as Stereo triangulation, Sheet of light triangulation, Structured light, Time-of-flight, Interferometry, Coded Aperture.

The system of the present invention for a streaming service provider to stream video to customers and bill customers based on headcount comprises a media content library which is stored in infrastructure; a website server where customers can access, view catalog of the media content, register for membership or request to set up an account, log in, order streaming media to watch, view and pay bill, etc.; a center for streaming media content to customers via streaming mechanism known in the art and copyright protection known in the art; a set of equipment (both hardware and software) capable of facial recognition so that it can determine how many viewers are watching streaming content and sending the headcount and/or billing back to web server and/or database for storage; a database to store customer account information including customer identification, order information, billing information.

Figure 2:
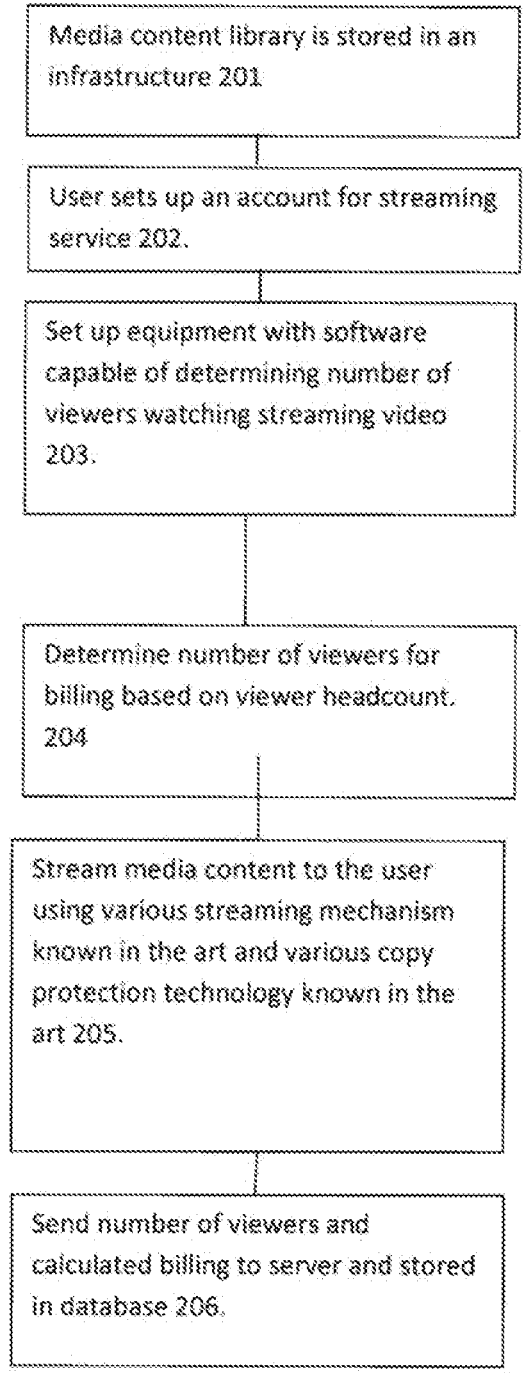
FIG. 2 illustrates a process which provides a media streaming service and billing according to the present invention for media streaming on a basis of viewers headcount pricing model.

FIG. 2 illustrates a system 200 according to the present invention for media streaming on a basis of viewers headcount pricing model. Initially at step 201, the media content library of the streaming service provider is stored in an infrastructure. User sets up an account to use the system's streaming service at step 202. The streaming service provider either provides the equipment which is capable of facial recognition or it may be purchased from the streaming service providers or other retailers or the streaming service providers may utilize existing equipments with similar technology that is supported by the service 203. The system utilizing the equipment and software that includes the facial recognition software for the camera to determine the number of viewers for billing based on the viewer headcount basis at step 204. Then, the system streams media content to the user using various streaming mechanisms known in the art and various copy protection technology known in the art. The streaming service (i.e. media content provider) sends the media content data stored in the streaming service's infrastructure to the content delivery networks (which may include Limelight, LEvel 3 and Akamai). The content delivery networks then feed the content to local internet service providers (ISPs) at step 205.

The number of viewers and the calculated billing is determined by the streaming service provider's software and sent to the servers where it is stored for record and the payment is charged to the customer accordingly 206.

Figure 3:
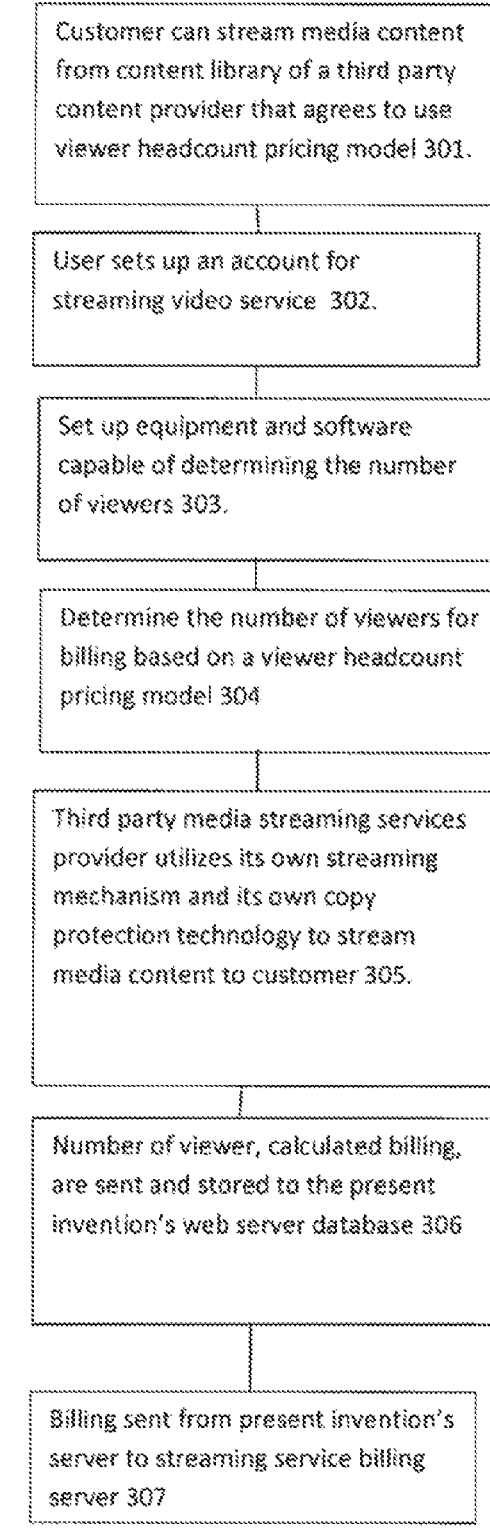

Optionally, customers can stream media content from content library of a third party content provider that agrees to use viewer headcount pricing model. The process for streaming video from a third party and pay per viewer's headcount are illustrated in FIG. 3.

Initially, a user is presented with menu of service provider's media content from the third party's content library stored in infrastructures at step 301. Then, the user may set up an account for the media streaming service with the third party streaming service providers in partnership with the system of the present invention at step 302. The third party streaming service provider either provides the equipment or it may be purchased from the streaming service providers or other retailers. The system may utilize equipments with similar technology that is supported by the service at step 303. The third party streaming service provider's software may be integrated with the present invention's software to determine the number of viewers for billing based on viewer headcount at step 304. Streaming service may utilize its own streaming mechanism and its own copy protection technology to deliver content to a customer. The data are sent from the streaming service's infrastructure where the film data are located to the content delivery networks (which may include Akamai, Limelight, and LEvel 3) that feed the content to local ISPs at step 305. The number of viewers and the calculated billing is determined by the present invention's software and sent to the present system's servers and database where it is stored for record and the payment is charged based on the various charging schemes of different third party streaming services on the usage recognized by the system and therein provided to the server by the customer 306. Optionally, billing information may be sent from system's server to streaming service billing server at step 307.

In addition to the systems and methods to track the number of viewers watching the streaming video and thus charge the viewers on headcount basis, the streaming service providers also need to have systems and methods to avoid online theft of the streaming media to ensure their revenues won't be negatively affected.

Streaming services can utilize its own streaming mechanism and its own copy protection technology to avoid online theft. For example, Netflix is one of the largest names in streaming media. Netflix's content library is encoded into three bandwidth tiers, in a compression format based on the VC-1 video and Windows Media audio codecs. Netflix currently relies on custom client applications, the Microsoft's PlayReady Digital Rights Management (DRM) for all Netflix-ready devices which is supported by the Silverlight media playback plugin from Microsoft to decrypt its protected video streams. Currently, more and more companies are joining the video streaming service such as Amazon and Google (via its YouTube subsidiary).

Microsoft, Netflix and Google have a new proposal to add encryption for protecting copyright content through an extension to the HTML5 media streaming capability.

The term, 'Encrypted Media Extensions,' is a cryptography implementation that does not add digital rights management (DRM) technology to the HTML5 specification. The proposed extension simply uses decryption by giving the HTML5MediaElement the ability to acquire a decryption key using JavaScript. The protected video or audio stream can then be decrypted within the playback module or browser using the key.

The system of the present invention when streaming its own media content to the user can use these various encoding and streaming mechanisms known in the art and various decoding and copy protection technology known in the art.

While there have been shown and described herein the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method for ensuring entertainment media content providers that the correct number of viewers are paying for their streaming service using a cost by viewer headcount pricing model comprising:
   providing viewing module and/or equipment and a viewer-headcount software which is capable of face recognition utilizing recognition technology to verify the number of viewers;
   providing a central database and web server to receive and record the number of viewers;
   providing streaming mechanism for the media content provider to deliver their media content to viewers and utilizing copyright protection technologies to prevent theft of the video content; and
   providing integration of the viewer-headcount software with a third party media content provider's software so that the third party can utilize the viewer-headcount software and the equipment to charge customers on a viewer headcount basis;
   wherein the equipment and software is capable of recognizing any new additional viewer identified by the recognition technology within seconds, updating and sending the headcount information to the web server for billing process and the database for storage;
   wherein the equipment and software is capable of calculating the billing for each streaming video by the number of viewers and sending information to the web server and the database.

2. A system for providing streaming service and ensuring that the streaming is paid on a viewer headcount basis, the system comprising:
   a media content library which stores the media content to be streamed to customers;
   a streaming service capable of streaming media content to customers;
   a set of equipment and viewer-headcount software that is capable of determining number of viewers;
   a web server where customers can access, view catalog of the media content, register for membership or request to set up an account, log in, order streaming media to watch, view streaming video, view and pay bill; and
   a database for storing customer account information including customer identification, order and billing information;
   wherein the equipment utilizes facial recognition technology to determine the number of viewers;
   wherein the viewer-headcount software is integrated with a third party media content provider's software so that the third party can utilize the viewer-headcount software and equipment to charge customers on a viewer headcount basis.

* * * * *